(No Model.)
J. M. KEITH.
MEANS FOR PROPELLING RAILWAY CARS.
No. 403,758. Patented May 21 1889.
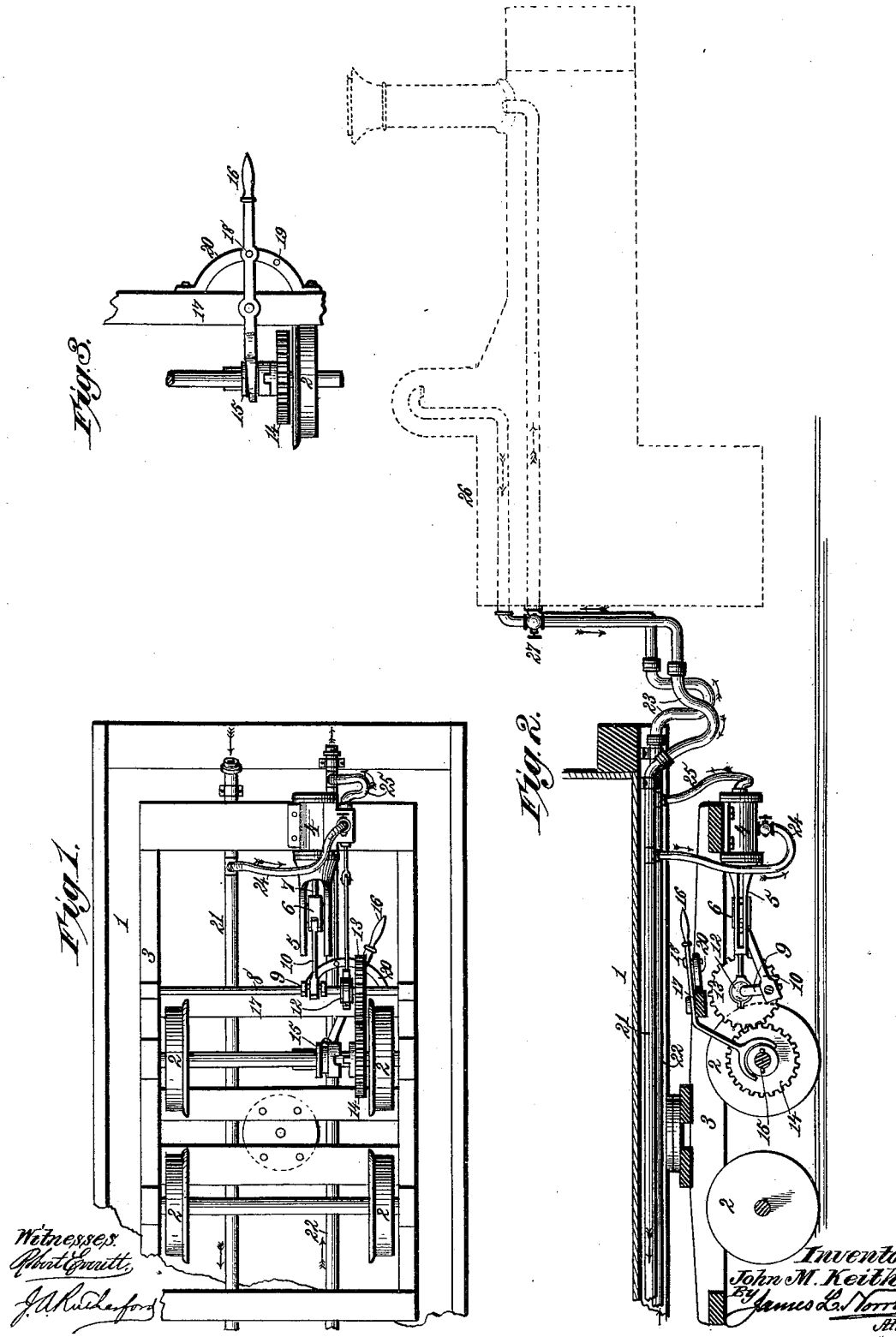

UNITED STATES PATENT OFFICE.

JOHN M. KEITH, OF CORSICANA, TEXAS.

MEANS FOR PROPELLING RAILWAY-CARS.

SPECIFICATION forming part of Letters Patent No. 403,758, dated May 21, 1889.

Application filed January 3, 1889. Serial No. 295,293. (No model.)

*To all whom it may concern:*

Be it known that I, JOHN M. KEITH, temporarily domiciled at Tampico, State of Tamaulipas, Republic of Mexico, a citizen of the United States, residing at Corsicana, in the county of Navarro and State of Texas, have invented new and useful Improvements in Motive Power for Railway-Cars, of which the following is a specification.

My invention relates to motive power for railway-cars, and the purpose thereof is to provide a simple combination of parts whereby each car may be impelled by a separate motor, the entire series throughout a line or train of cars being supplied with energy from a common source, whereby the full horse-power of a steam-boiler may be applied in a manner enabling it to be utilized to the greatest possible advantage and to the utmost extent.

The invention consists in the several novel features of construction and new combinations of parts hereinafter fully set forth and then definitely pointed out in the claims.

In the accompanying drawings, Figure 1 is a bottom plan view of a car equipped according to my invention. Fig. 2 is a partial vertical section showing the arrangement relatively to the source of the steam. Fig. 3 is a detail view showing a portion of one of the car-axles and the end of the truck-frame.

In the said drawings, the reference-numeral 1 denotes a car suitable for travel upon a railway of any known form of construction, said car being supported upon running-gear consisting of wheels 2, mounted upon trucks 3 in the usual manner.

In applying my invention to a car of ordinary construction, I either extend the truck-frame at one end or build a suitable support thereon, the former being the construction shown in the drawings. Upon this extended portion of the truck-frame is mounted a cylinder, 4, bolted securely to the end bar of the truck-frame in such manner that the stroke of the piston shall be in a fore-and-aft direction. Upon the end of the cylinder I form or attach parallel brackets 5, in which slides a head, 6, to which the piston-rod 7 is connected, whereby parallel motion is communicated to the latter. Upon the truck-frame 3, a little in advance of the wheels, I mount in suitable bearings a shaft, 8, having a crank, 9, to which the pitman 10 is connected from the piston-head 6. The shaft 8 also carries an eccentric, 12, by which the movement of the cylinder-valves is effected, these parts being of any known and suitable construction.

Upon the shaft 8, just within the wheels of the car, is rigidly mounted a gear, 13, of any suitable form and size, said gear meshing with a gear, 14, loose upon the car-axle. Splined upon the said axle in such manner as to permit longitudinal adjustment thereon is a clutch, 15, which may be locked with the gear 14 or released therefrom at pleasure by means of a simple shipping-lever, 16, of any suitable form. I have shown in the drawings a lever of the simplest construction fulcrumed upon a cross-brace, 17, of the truck-frame, and having a locking pin or detent, 18, which engages with openings 19 in a curved plate or bar, 20, by which the lever and clutch may be held in either the locked or unlocked position, as shown in Fig. 3.

Beneath the floor of the car are arranged separate pipes 21 and 22, running parallel with the length of the car, and of such length that they may be coupled by flexible connections 23 to the ends of similar pipes on the next car or cars, the flexible couplings being similar to those used upon steam and air brakes. From one of these pipes, as 21, at a suitable point, connection is made with a flexible pipe, 24, entering the steam-chest or valve-chest of the cylinder, and a similar flexible pipe, 25, makes connection between the exhaust of the cylinder and the separate pipe 22. The pipe 21 is coupled to a connecting-pipe on the next car, and so on throughout the train, and is supplied with steam from a common boiler, 26, which may be the boiler of the locomotive or a separate boiler, and the other pipe, 22, similarly connected thoughout the train, opens into the stack and carries off the exhaust of the cylinders or discharges at any other suitable point.

The live-steam and exhaust pipes 21 and 22 on the forward car are connected to the live-steam and exhaust pipes on the boiler 26 by flexible couplings 23, similar to those which connect the steam and exhaust pipes on the adjacent cars.

The equipment being such as described, it will be seen that each motor will receive live steam from the boiler independently, and will exert its power upon the particular car to which it is attached. If each motor, for example, be of six horse-power, a one-hundred-horse-power boiler will supply eighteen motors and propel a train of that number of loaded cars up heavy grades with ease and speed. The steam may be admitted to and cut off from the pipe 21 at the boiler, or a separate cut-off may be applied to each cylinder and operated by any suitable form of lever, actuated from one or both ends of the car. I have shown, however, a cock or throttle, 27, for this purpose, which will be under the control of the engineer; but I do not limit myself to such arrangement, as I may control the steam-supply at each separate cylinder. I may also connect the shipping-lever 16 to an actuating-lever capable of being operated from the platform or other part of the car.

What I claim is—

1. In a railway-car, the combination, with a wheel-axle, of a gear mounted loosely on said axle, a clutch for making said gear fast with the axle, a crank-shaft having a gear meshing with the axle-gear, a steam-cylinder mounted on the car-truck and having its piston and valves connected with said crank-shaft, separate live-steam and exhaust pipes connected, respectively, by flexible couplings to the live-steam and exhaust ports of the steam-cylinder, said pipes having at their ends flexible couplings to corresponding pipes on the adjacent car or cars, and a common steam-supply to which one of said pipes is connected, substantially as described.

2. In a railway-car, the combination, with a car-axle, of a steam-cylinder mounted on the truck-frame, a crank-shaft connected to the piston and valves of said cylinder, a gear fixed to said crank-shaft, a gear loose on the car-axle and meshing with the crank-shaft gear, a clutch splined on the axle, a shipping-lever for actuating said clutch, a live-steam pipe and an exhaust-pipe carried by said car and connected to the steam-cylinder, means for connecting said pipes to similar pipes upon an adjacent car or cars, and a steam-supply common to the steam-cylinders of several cars in a train, substantially as described.

In testimony whereof I affix my signature in presence of two witnesses.

JOHN M. KEITH.

Witnesses:
E. J. HITCHCOCK,
ARTHUR ADAMS.